H. C. CARR.
Wheel Plow.
No. 106,548.                                   Patented Aug. 23, 1870.
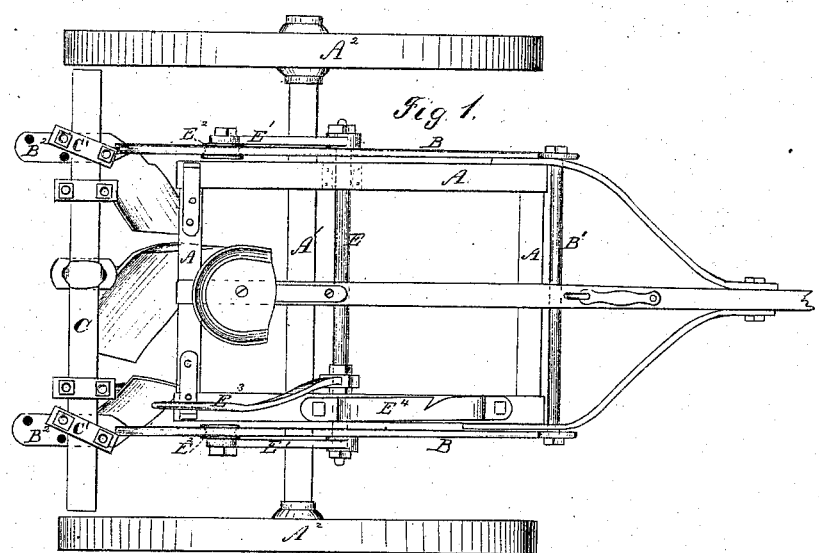
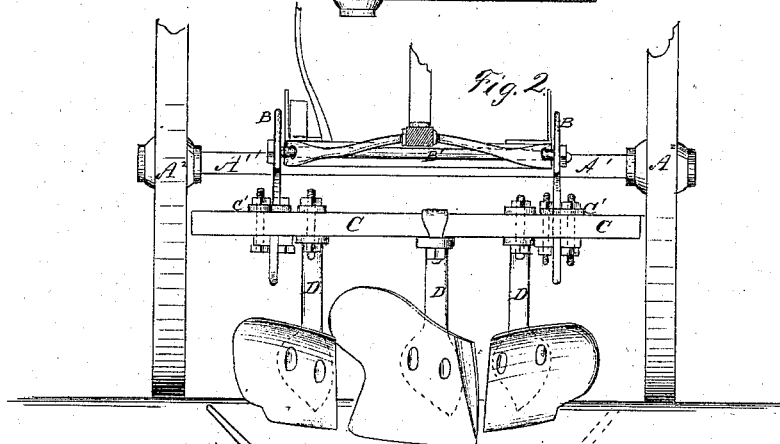
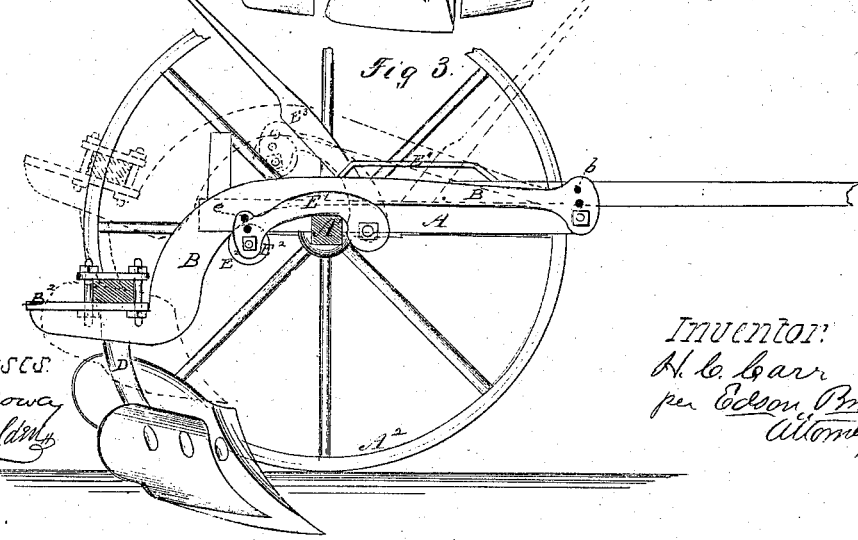

United States Patent Office.

HENRY C. CARR, OF BORDENTOWN, NEW JERSEY.

Letters Patent No. 106,548, dated August 23, 1870.

IMPROVEMENT IN WHEEL PLOWS.

The Schedule referred to in these Letters Patent and making part of the same

*To all whom it may concern:*

Be it known that I, HENRY C. CARR, of Bordentown, in the county of Burlington and State of New Jersey, have invented certain Improvements in Wheel Plows; and I do hereby declare that the following is a full, clear, and exact description thereof, reference being had to the annexed drawing making part of this specification, in which—

Figure 1 is a plan view of my improved wheel plow.

Figure 2 is a front elevation.

Figure 3 is a longitudinal vertical section.

The same letters are used in all the figures to indicate identical parts.

This invention relates to a wheel plow, which may be used as a gang-plow for turning the soil, or as a cultivator for cultivating corn, or other growing crops planted in rows; and My improvements consist in the combination and arrangement of certain devices constituting a part of such a plow, as will be more specifically set forth in the following description and claim.

To enable those skilled in the art to make and use my invention, I will proceed to describe its construction and operation.

The frame A, to which the different parts of the plow are attached, is composed of longitudinal and transverse beams, firmly bolted together, and secured to an axle, $A^1$, by means of which it is mounted upon carrying-wheels $A^2 A^2$. It is provided with a draft-pole, and a seat for the driver, in the usual manner.

B B represent two beams, disposed parallel to each other, one upon each side of the frame, and pivoted at their forward ends upon a horizontal bolt or shaft, $B^1$, which extends across the frame, and may be supported in the tongue-braces, as shown, or in other convenient manner.

From their pivotal point, which is made adjustable by means of a series of holes, $b\ b$, the beams extend to the rear, above the axle, in rear of which they are curved downward, and terminate in a short horizontal portion with a horizontal flange, $B^2$, upon its upper edge, which flanges extend a sufficient distance beyond the periphery of the carrying-wheels that a cross-beam may be secured upon them to reach laterally beyond such wheels, when it is desirable to cultivate several rows of growing crops at one time.

For ordinary purposes a cross-beam, C, of less length than the distance between the inner faces of the wheels, is secured by clips $C^1 C^1$ upon the flanges of the beams B, and to this cross-beam the standards for carrying the shovels or plow-molds are fastened at the proper points by clips, or in any other suitable manner.

When the machine is to be used for cultivating growing crops, the standards D D are attached to the cross-beam, provided with suitable shovels for that purpose.

To convert it into a wheel-plow these standards, with their shovels, are removed, and a standard, D', with a plow-share and mold-board for turning the soil, is substituted.

The beams B are supported in rear of the axle upon adjustable friction-rollers $E^2 E^2$, which revolve upon studs secured to arms $E^1 E^1$, on the ends of a horizontal rock-shaft E. The latter is arranged in bearings on the frame A, a short distance in front of the axle, and lies in about the same horizontal plane with such axle, upon which its arms $E^1$ rest, when the plows are lowered into the earth.

The rock-shaft is provided with a hand-lever, $E^3$, by which the driver may turn it, so as to raise the plows out of the ground; and a rack, $E^4$, secured at the proper point on the frame, is provided for stationing the lever in the position shown in dotted lines in fig. 3, for the purpose of holding the plows above the ground.

The depth at which the plows shall enter the soil can be regulated either by depressing the forward ends of the beams B, or by raising the friction-rollers $E^2$, a vertical series of holes, $e$, being provided in the arms $E^1$ for that purpose.

What I claim as my invention, and desire to secure by Letters Patent, is—

1. The arrangement of the beams B, made adjustable by means of a series of holes, $b\ b$, shaft $B^1$, and cross-beam C, substantially as set forth.

2. The arrangement of the beams B, rock-shaft E, arms $E^1$, and adjustable rollers $E^2$, substantially as set forth.

In testimony whereof I have signed my name to this specification in the presence of two attesting witnesses, this 7th day of July, 1870.

HENRY C. CARR.

Witnesses:
 PHILIP S. SCOVEL,
 JAMES FURMAN.